United States Patent [19]
Hurn et al.

[11] Patent Number: 6,026,576
[45] Date of Patent: Feb. 22, 2000

[54] PORTABLE CIRCULAR SAW

[75] Inventors: Richard Hurn, Bel Air; Judd Staples, Baltimore, both of Md.; Gregory Arnold, Shreveport, La.; David Campbell, Bel Air, Md.

[73] Assignee: Black & Decker Inc., Newark, Del.

[21] Appl. No.: 09/300,974

[22] Filed: Apr. 28, 1999

Related U.S. Application Data

[63] Continuation of application No. 09/158,481, Sep. 22, 1998, Pat. No. 5,930,903, which is a continuation of application No. 08/866,790, May 30, 1997, Pat. No. 5,850,698.

[51] Int. Cl.$^7$ .................................................. B23D 47/12
[52] U.S. Cl. .......................... 30/391; 30/275.4; 30/298.4; 30/377
[58] Field of Search .......................... 30/390, 391, 275.4, 30/298.4, 377, 388

[56] References Cited

U.S. PATENT DOCUMENTS

| | | | |
|---|---|---|---|
| 1,253,705 | 1/1918 | Metzger | 30/377 |
| 1,792,204 | 2/1931 | Wallance et al. | 30/377 |
| 2,346,961 | 4/1944 | Gundelfinger et al. | 30/391 |
| 2,657,719 | 11/1953 | Forsberg | 30/377 |
| 3,245,439 | 4/1966 | Sheps et al. | 30/390 |
| 4,406,064 | 9/1983 | Gross | 30/298.4 |
| 4,414,743 | 11/1983 | Pioch et al. | 30/390 |
| 4,787,145 | 11/1988 | Klicker et al. | 30/275.4 |
| 5,850,698 | 12/1998 | Hurn et al. | 30/391 |
| 5,930,903 | 8/1999 | Hurn et al. | 30/391 |

*Primary Examiner*—Hwei-Siu Payer
*Attorney, Agent, or Firm*—Adan Ayala

[57] ABSTRACT

The disclosed portable circular saw includes a motor having an axis, a housing enclosing the motor therein, a handle carried by the housing, an arbor operatively connected to the motor, the arbor having an axis of rotation substantially perpendicular to the motor axis, and a shoe supporting the housing thereon. The housing is inclined at an angle relative to the shoe. The handle is also disposed between the housing and the shoe. Preferably, the housing inclination angle is about 45°. The saw may also include a drive shaft disposed on the motor axis and a transmission mechanism connected to the arbor and the drive shaft. This transmission mechanism creates a torque in the rotational direction opposite to the rotational direction of the arbor. Preferably, the transmission mechanism includes a first gear disposed on the drive shaft, and a second gear disposed on the arbor, where the second gear meshes with the first gear. It is preferable that distance from the blade to the end of arbor is longer than distance from the blade to the drive shaft. The saw may also include a hook assembly attached to the handle at a position relative to the saw's center of gravity so that, when the circular saw is hung from the hook assembly, the handle pivots upward. Preferably, the hook assembly is a folding hook assembly. The hook assembly may include a barrel integrally attached to the handle, and a hook slidably connected to the barrel.

26 Claims, 10 Drawing Sheets

PORTABLE CIRCULAR SAW

CROSS-REFERENCE TO RELATED APPLICATIONS

This application is a continuation of U.S. application Ser. No. 09/158,481, filed Sep. 22, 1998, now U.S. Pat. No. 5,930,903, which is a continuation of U.S. application Ser. No. 08/866,790, filed May 30, 1997, now U.S. Pat. No. 5,850,698.

FIELD OF THE INVENTION

The present invention relates to portable circular saws and, more particularly, in-line, end handle or worm drive portable circular saws.

BACKGROUND OF THE INVENTION

Generally, portable circular saws include a housing enclosing an electric motor therein, a handle carried by the housing, a circular saw blade operatively connected to the electric motor, a blade case fixed to the housing and adapted to enclose substantially the upper half of the saw blade, a shoe for supporting the housing thereon, and a cover pivotally mounted on the housing and adapted to cover substantially the lower half of the saw blade projecting from the base plate. One common arrangement for portable circular saws is the "spur gear" circular saw. In such circular saw, the motor drive rotation axis is coincident or substantially parallel to the blade rotation axis. One such circular saw is shown in U.S. Pat. No. 5,561,907.

Another common arrangement for portable circular saws is the worm drive circular saw 100, as shown in FIG. 1. Unlike the spur gear circular saw, the motor axis 261 is substantially perpendicular to the blade rotation axis 262. In addition, the worm drive saw has an elongated housing 26 enclosing the motor. The main handle 263 is located at the end of the motor housing.

Traditionally, a worm gear transmission is used to operatively connect the motor to the blade drive shaft perpendicularly rather than in parallel. However, bevel gear transmissions are also used for the same purpose. Nevertheless, people still call saws with bevel gear transmissions "worm drive saws".

A worm drive saw is preferred over spur gear saws by some users because the housing is longer and narrower than a spur gear saw. The longer housing is desirable for some applications, such as construction of wooden frames, roofs, ceilings, floors, etc., that require a longer housing to reach the workpiece.

The present invention offers two distinct advantages over the prior art worm drive saw. The first is improved balance and maneuverablility by locating the center of gravity closer to the main handle.

The second addresses the condition that the motor axis is in the prior art generally coaxial to the user's arm when holding the saw by the main handle. The present invention effects improved handling by changing the handle position.

Improved user handling is also accomplished by modifying the prior art transmissions. FIG. 2 shows a prior art transmission. The motor 15 has a drive shaft 25 connected to a gear 251. This gear 251 meshes with a bevel gear 31, which in turn is fixed to an arbor 21, which drives the blade 28 in a clockwise direction X, as is necessary for cutting. The bevel gear 31 is located to the left of the drive shaft 25. In other words, the distance between the blade 28 and the bevel gear 31 is substantially equal to or less than the distance from the blade 28 to the drive shaft 25 providing a transmission of less weight and smaller size. However, the drive shaft rotates in a counterclockwise direction 17 and creates a clockwise direction X, creating a clockwise reaction torque 27.

It is also known in the prior art to provide a hanger on a circular saw for hanging the saw from a joist where there are no table-like supports and the saw is not in use. Prior art hangers have been proposed to orient the main handle vertically upward for easy accessibility, but they increase the width or height of the saw. See, e.g., U.S. Pat. Nos. 2,841,192 and 4,406,064.

SUMMARY OF THE INVENTION

The present invention provides a portable circular saw comprising a motor having an axis, a housing enclosing the motor therein, a handle carried by the housing, an arbor operatively connected to the motor, the arbor having an axis of rotation substantially perpendicular to the motor axis, and a shoe supporting the housing thereon. The housing is inclined at an angle relative to the shoe when the saw is at the maximum depth of cut setting. The handle is also disposed between the housing and the shoe. Preferably, the housing inclination angle is about 45°.

Another embodiment of the invention provides a portable circular saw having front and rear sections comprising a motor having an axis, a housing enclosing the motor therein, a handle carried by the housing, the handle being disposed in the rear section of the saw, an arbor operatively connected to the motor, the arbor having an axis of rotation substantially perpendicular to the motor axis and being disposed in the front section of the saw, and a shoe supporting the housing thereon. The respective positions of the arbor and the handle define a direction of elongation. The housing in turn is inclined at an angle relative to the direction of elongation. Preferably, the handle is disposed between the housing and the shoe. It is also preferable to provide a housing inclination angle of about 45° when the saw is at a maximum depth of cut setting.

A further embodiment of the invention calls for a portable circular saw comprising a motor having an axis and a drive shaft disposed along the axis, a housing enclosing the motor therein, a handle carried by the housing, an arbor for carrying a circular saw blade, the arbor having an axis of rotation substantially perpendicular to the motor axis, a transmission mechanism connected to the arbor and the drive shaft, the transmission mechanism creating a torque in a rotational direction opposite to the rotational direction of the arbor, and a shoe supporting the housing thereon. Preferably, the transmission mechanism comprises a first gear disposed on the drive shaft, and a second gear disposed on the arbor, where the second gear meshes with the first gear. It is also preferable that the distance from the blade to the second gear is greater than the distance from the blade to the drive shaft.

Another embodiment of the invention provides a portable circular saw having a center of gravity comprising a motor, a housing enclosing the motor therein and comprising a handle, an arbor operatively connected to the motor, a shoe supporting the housing thereon, and a hook assembly attached to the housing at a position relative to the center of gravity, wherein the center of gravity pivots about the hook assembly when the circular saw is hung from the hook assembly so that the handle pivots upward. Preferably, the hook assembly is a folding hook assembly. This hook assembly may include a barrel integrally attached to the handle, and a hook slidably connected to the barrel. It may also include a detent cap attached to the barrel for holding the hook in a plurality of radial positions, as well as a spring biasing the hook against the detent cap.

A further embodiment of the invention calls for a portable circular saw comprising a motor, a housing enclosing the motor therein, a handle carried by the housing, the handle having a sidewall, an arbor operatively connected to the motor, a shoe supporting the housing thereon, and a folding hook assembly attached to the sidewall of the handle so that, when the hook assembly is folded, the hook assembly substantially extends within the width of the shoe.

DESCRIPTION OF THE DRAWINGS

The accompanying drawings illustrate preferred embodiments of the invention according to the practical application of the principles thereof, and in which.

DETAILED DESCRIPTION OF THE PREFERRED EMBODIMENTS

Figure 1:
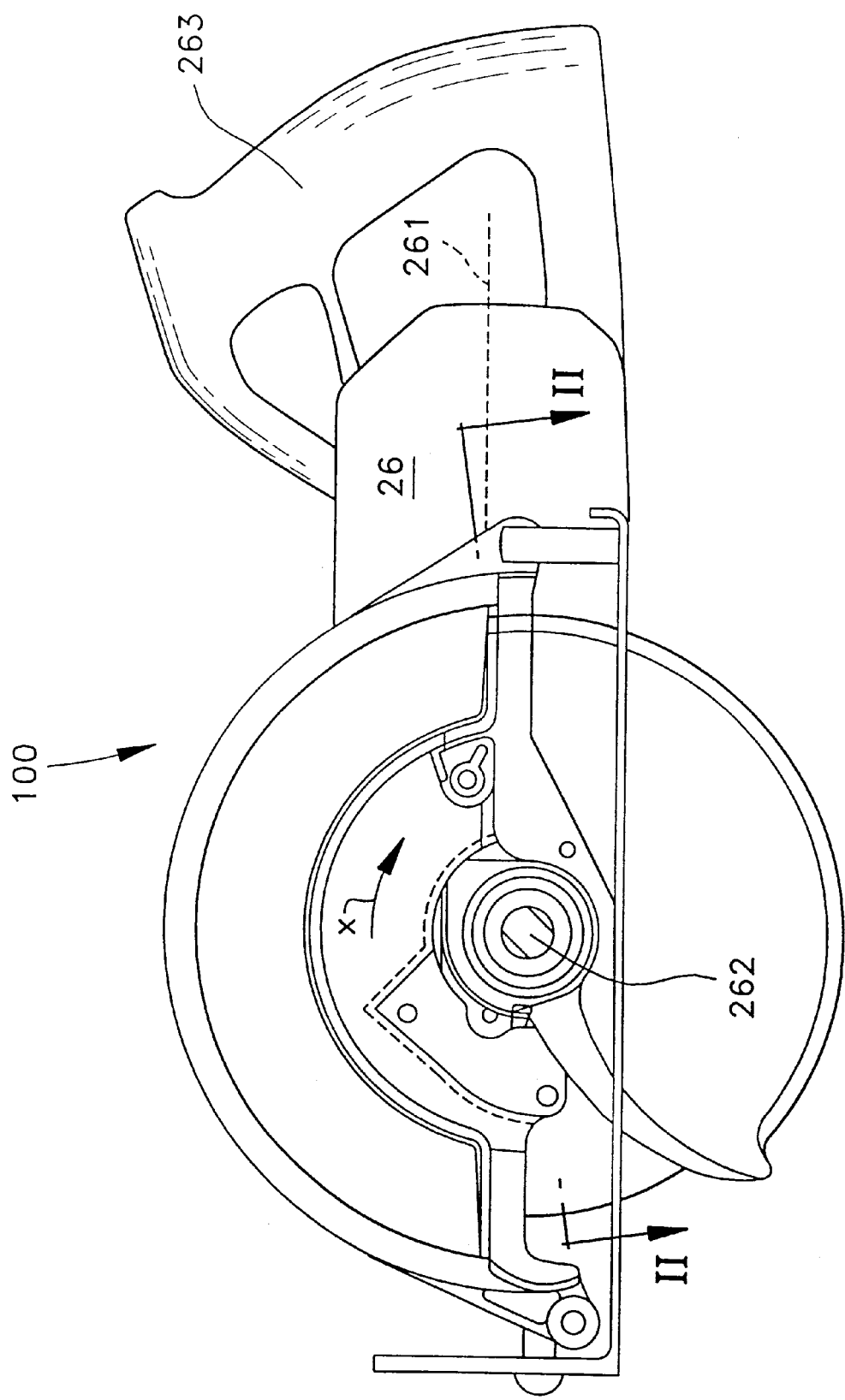
FIG. 1 is a left side elevational view of a prior art portable circular saw.
Figure 2:
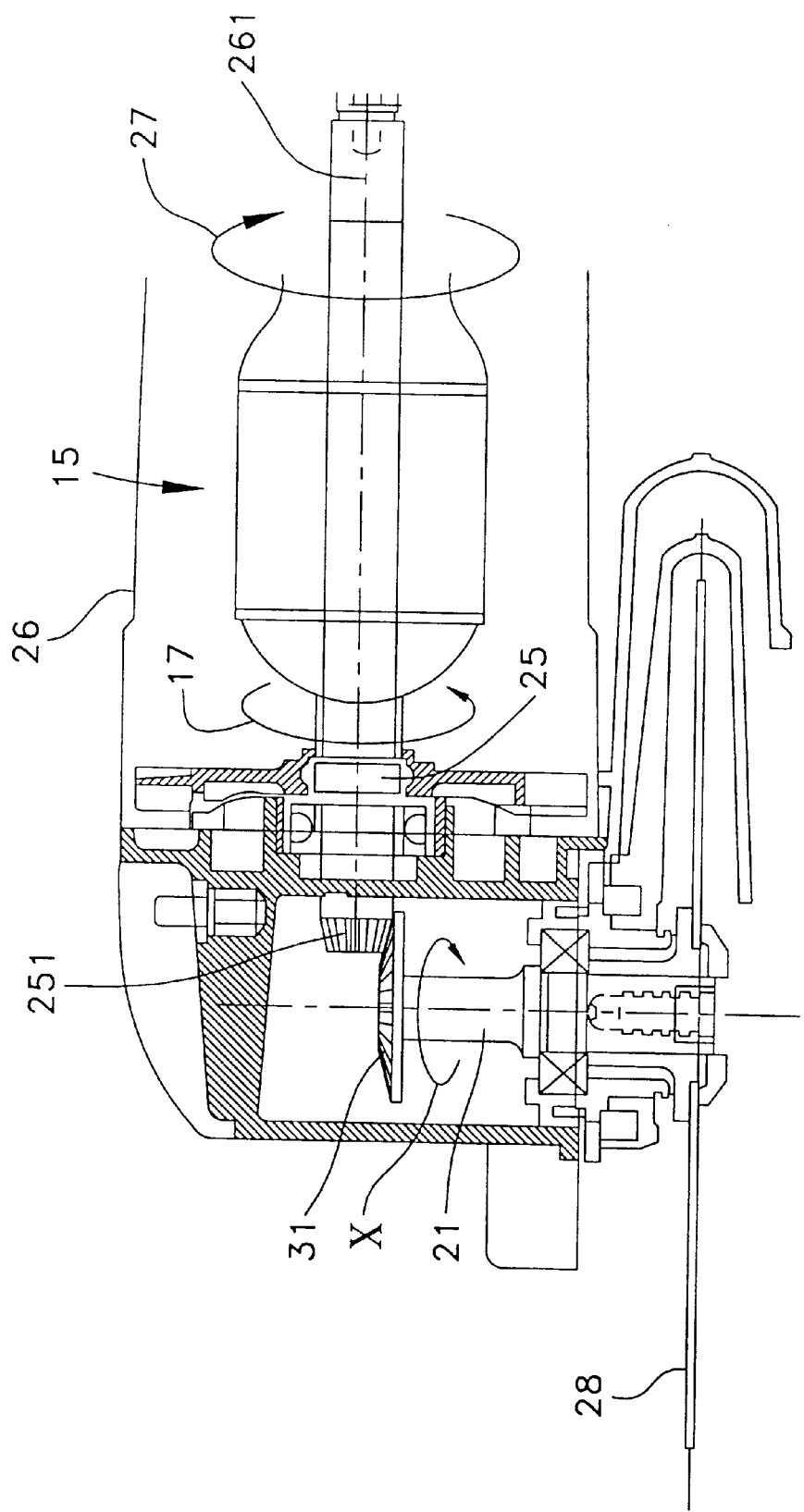
FIG. 2 is a partial cross-sectional view of the prior art saw along line II—II of FIG. 1.
Figure 3:
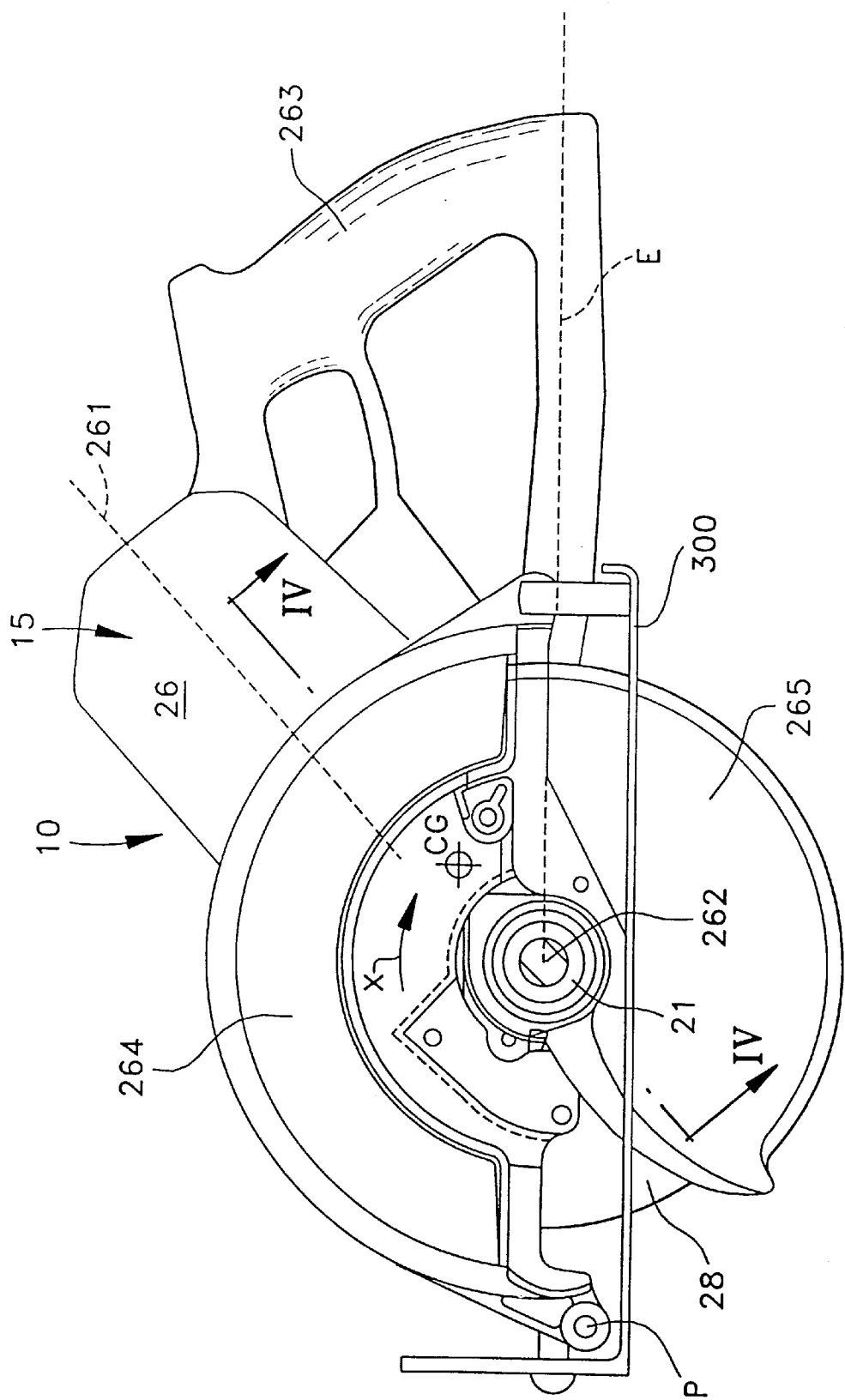
FIG. 3 is a left side elevational view of an embodiment of a portable circular saw according to the present invention.

The invention is now described with reference to the accompanying figures, wherein like numerals designate like parts. Referring to FIG. 3, a portable circular saw 10 is provided. The circular saw 10, like the prior art saw of FIG. 1, has a motor 15, an elongated housing 26 enclosing the motor 15, and an arbor 21 for carrying a circular saw blade 28. The motor axis 261 is perpendicular to the axis of the arbor 21 and to the blade rotation axis 262. In addition, the housing 26 carries the main handle 263.

The circular saw 10 also has a shoe 300 supporting the housing 26. Preferably, the shoe 300 supports the housing 26 in such manner so that the housing 26 can be beveled relative to the shoe 300. In addition, the shoe 300 supports the housing 26 in a manner well known in the art so that the housing 26 can be pivoted about pivot P in order to change the blade's depth of cut. Persons skilled in the art will recognize that the housing inclination angle will increase as the depth of cut setting is decreased.

It is also preferable to provide a fixed upper blade guard 264, attached to the housing 26, for covering the upper part of the blade 28. Preferably, a movable lower blade guard 265 for covering the lower part of the blade 28 is also provided.

As shown in FIG. 3, illustrating the saw 10 in its maximum depth of cut setting, the motor axis 261 is inclined relative to the shoe 300. Preferably, the motor axis 261 (and the housing 26) is inclined at about a 45° angle at the maximum depth of cut setting and a 80° angle at the minimum depth of cut setting. Other ranges of inclination angles can also be used. However, the 45° to 80° range is believed to maximize the handling advantages of the present invention.

The main handle 263 is then disposed between the housing 26 and the shoe 300. Accordingly, the rear end of the motor 15 is above and slightly forward of the main handle 263. Persons skilled in the art will recognize that, if the relative positions of the arbor 21 and the main handle 263 define a direction of elongation E, the housing 26 will be inclined relative to that direction of elongation.

This allows for improved balance due to the proximity of the motor's center of gravity CG to the main handle 263. It also allows for reduced overall length compared to prior art models. In addition, use at start-up is improved because the motor axis 261 is offset from the axis of the arm and as a result the torque is divided into side-to-side and twisting torque rather than solely a twisting torque.

Figure 4:
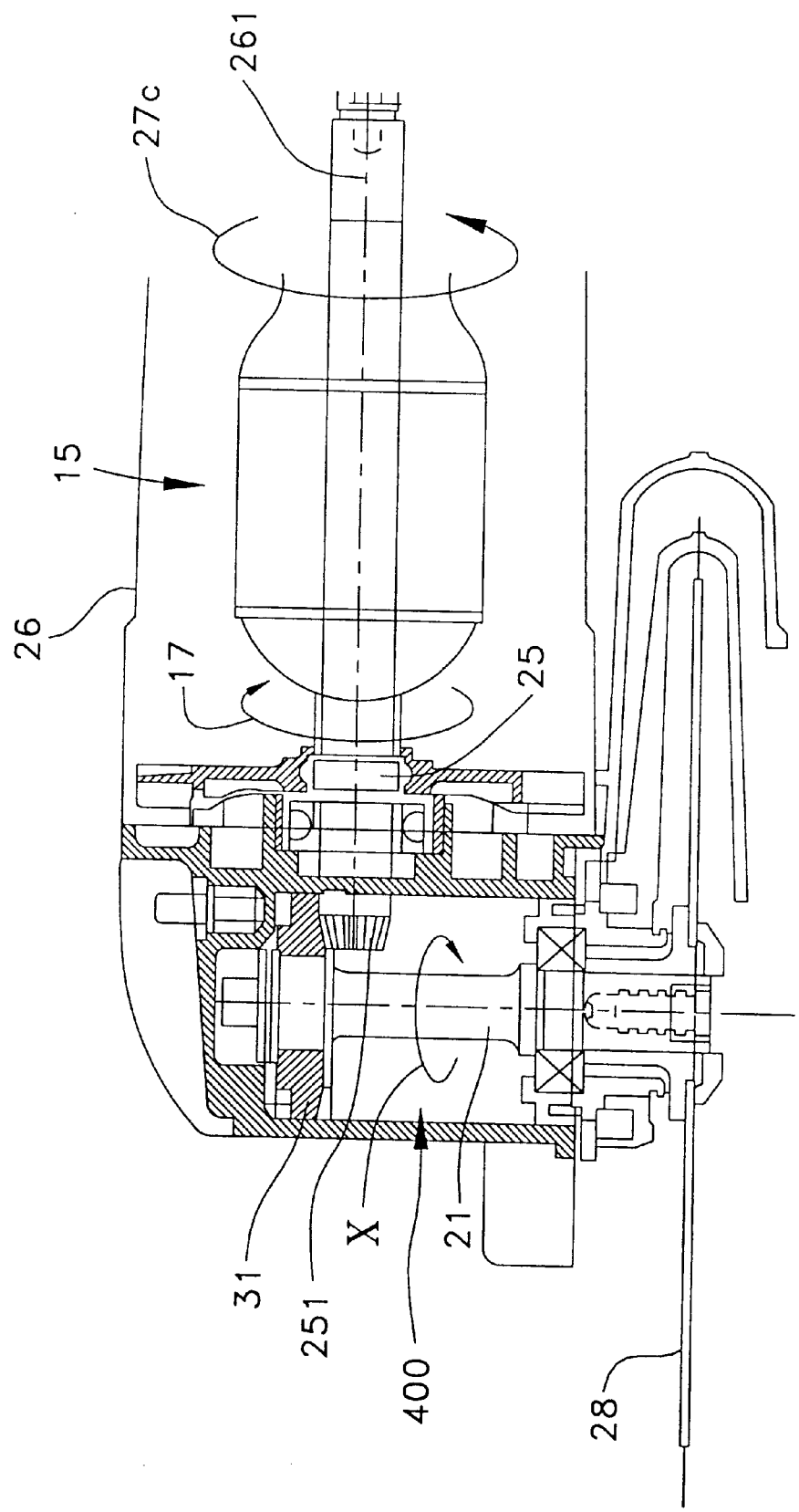
FIG. 4 is a partial cross-sectional view of the saw of FIG. 3 along line IV—IV.

FIG. 4 shows a cross-sectional view of the saw 10. The motor 15 has a drive shaft 25 along the motor axis 261. The drive shaft 25, in turn, is connected to a transmission mechanism 400. The transmission mechanism 400 connects the drive shaft 25 and the arbor 21, and includes a gear 251 disposed on the drive shaft 25, and a bevel gear 31 disposed on the arbor 21.

Unlike the prior art transmissions, the distance between the blade 28 and the bevel gear 31 is greater than the distance between the blade 28 and the drive shaft 25 such that the direction of the drive shaft rotation and arbor rotation are both clockwise. Such transmission mechanism 400 creates a counterclockwise reaction torque 27c, i.e., in the rotational direction opposite to the rotational direction (clockwise) of the arbor 21.

Figure 5:
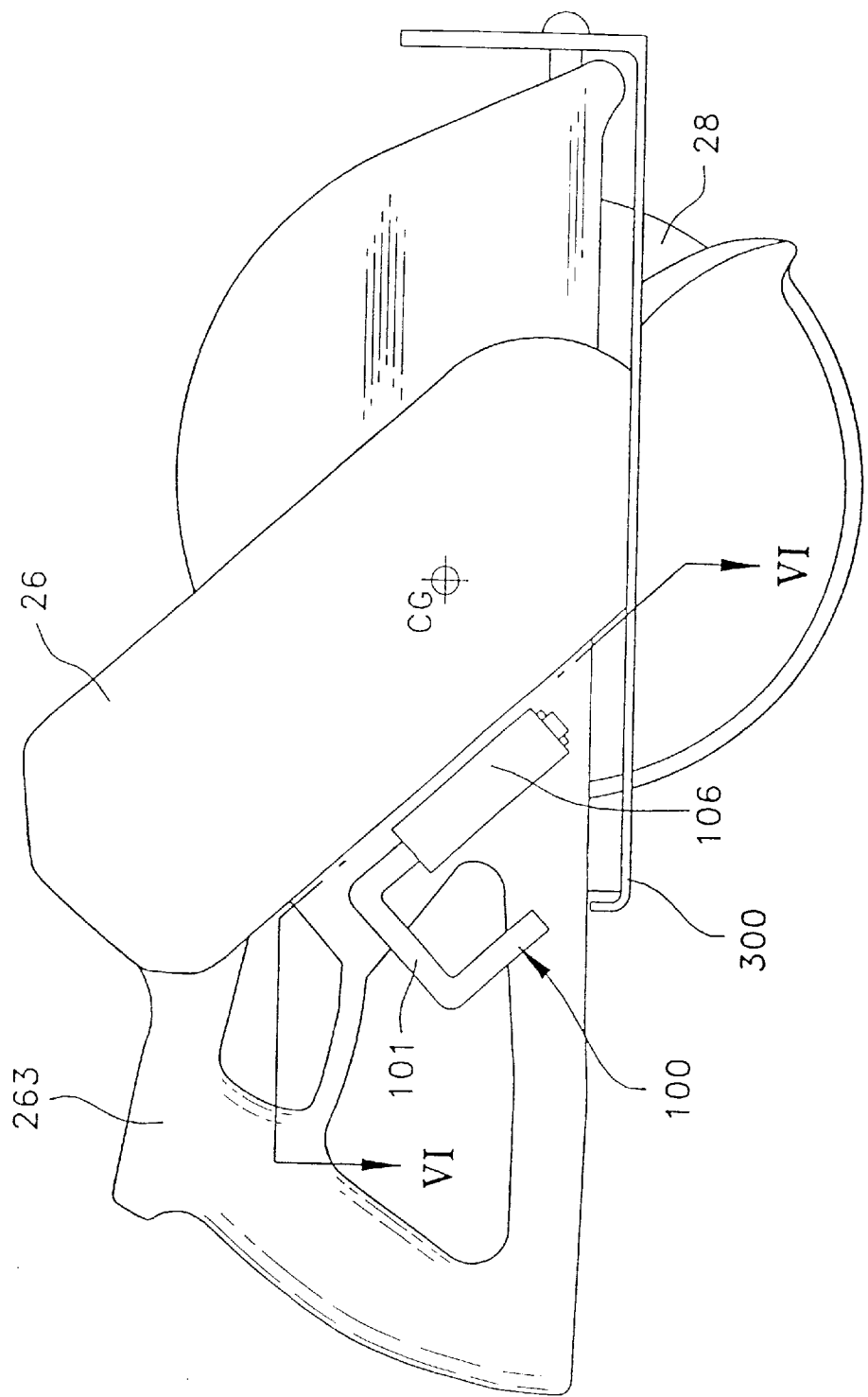
FIG. 5 is a right side elevational view of the saw of FIG. 3.
Figure 9:
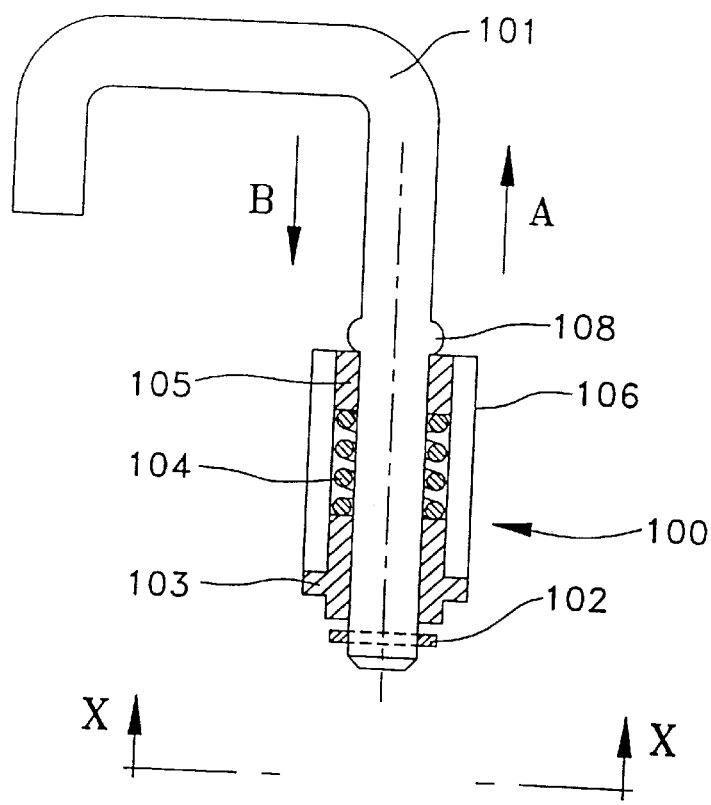
FIG. 9 is a cross-sectional view of the hook assembly shown in FIG. 6 along line IX—IX.
Figure 11:
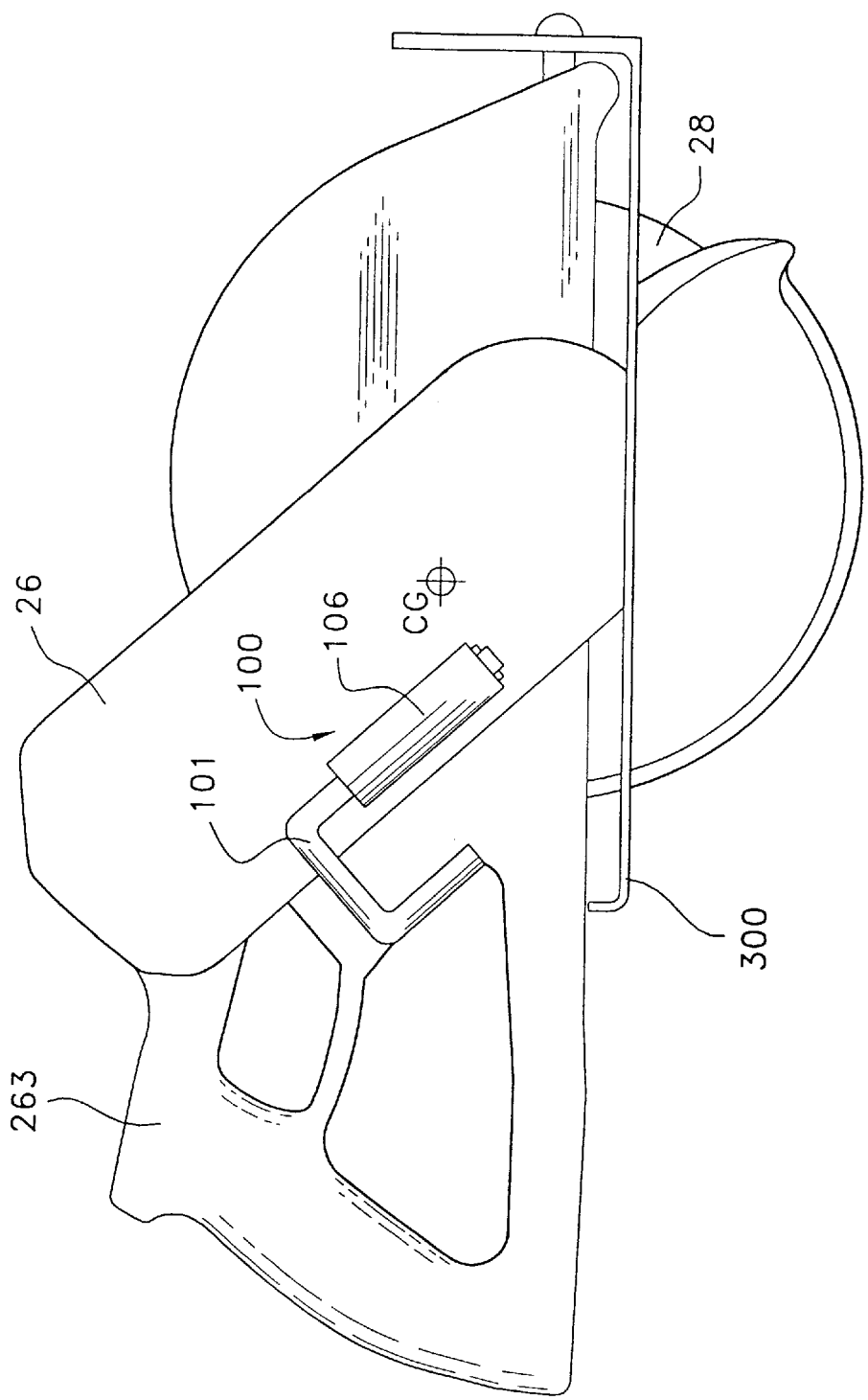

Referring to FIG. 5, a hook assembly 100 is integrally attached to the handle 263. Persons skilled in the art will recognize that the hook assembly 100 can be integrally attached instead to the housing 26, as shown in FIG. 11, where like numerals refer to like parts. Preferably, the hook assembly 100 is a folding hook assembly. Referring to FIG. 9, the hook assembly 100 includes a hook 101 and a barrel 106 for attaching the hook 101 to the saw.

Figure 10:
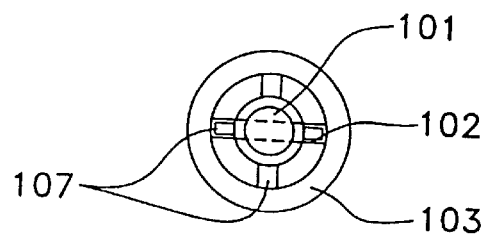
FIG. 10 is a partial bottom plan view of the hook assembly of FIG. 9 along line X—X and FIG. 11 is a right side elevational view of a second embodiment of a portable circular saw according to the present invention.

Preferably, the hook 101 has a roll pin 102 attached at its end. The roll pin 102 engages the detents 107 (FIG. 10) formed in a detent cap 103. The detent cap 103 is fixed to the bottom of the barrel 106 and permits the hook 101 to slide through it.

It is preferable to bias the hook 101 in the direction A so that the roll pin 102 is biased toward the detents 107 formed in the detent cap 103. A possible mechanism for biasing the hook 101 includes a spacer 105-slidably disposed within the barrel 106, which engages tags 108 formed on the hook 101. A spring 104 is then disposed between the detent cap 103 and the spacer 105 so that the spring 104 pushes the spacer 105 and hook 101 in the direction A.

Figure 6:
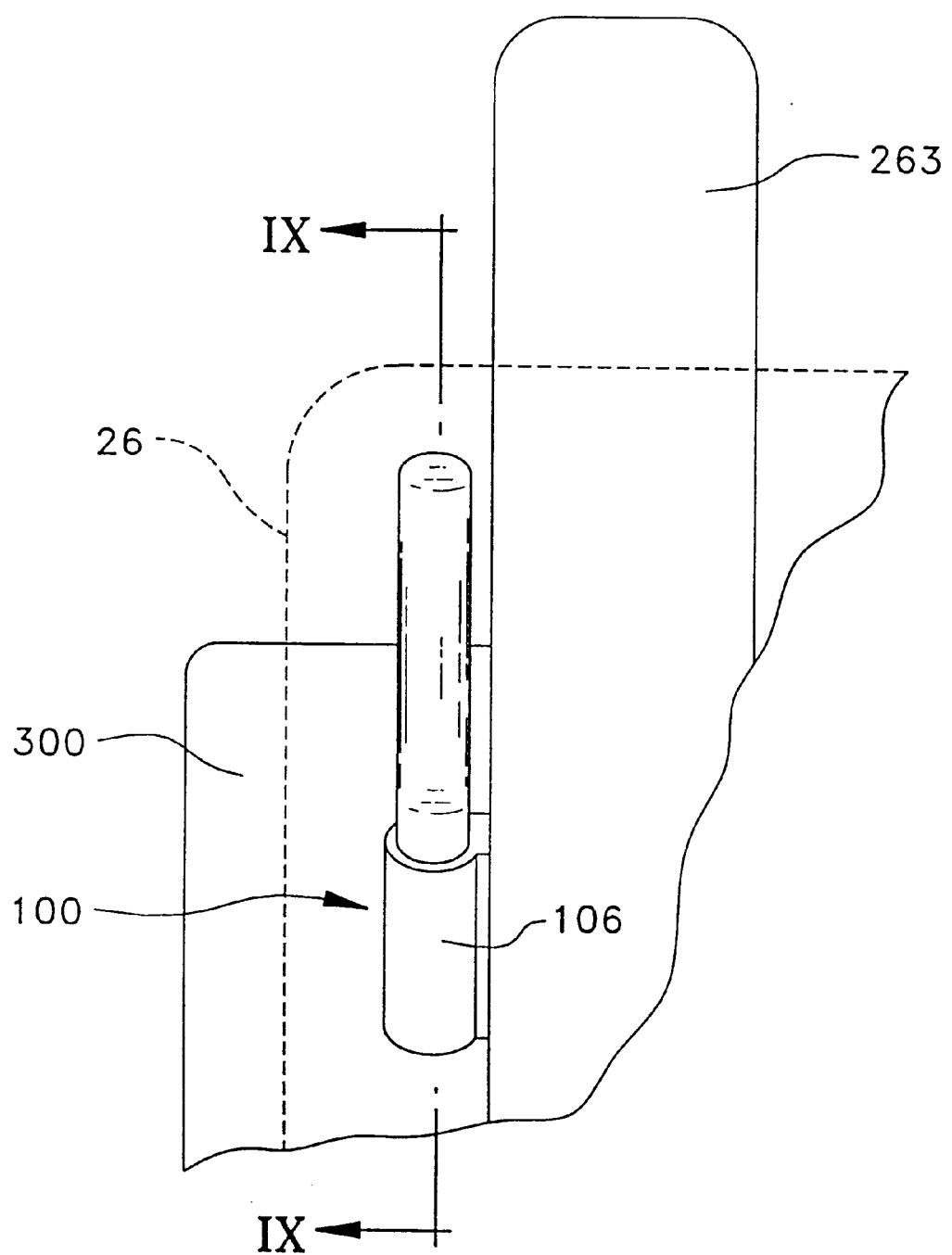
FIG. 6 is a partial top plan view of the saw of FIG. 5 along line VI—VI.
Figure 7:
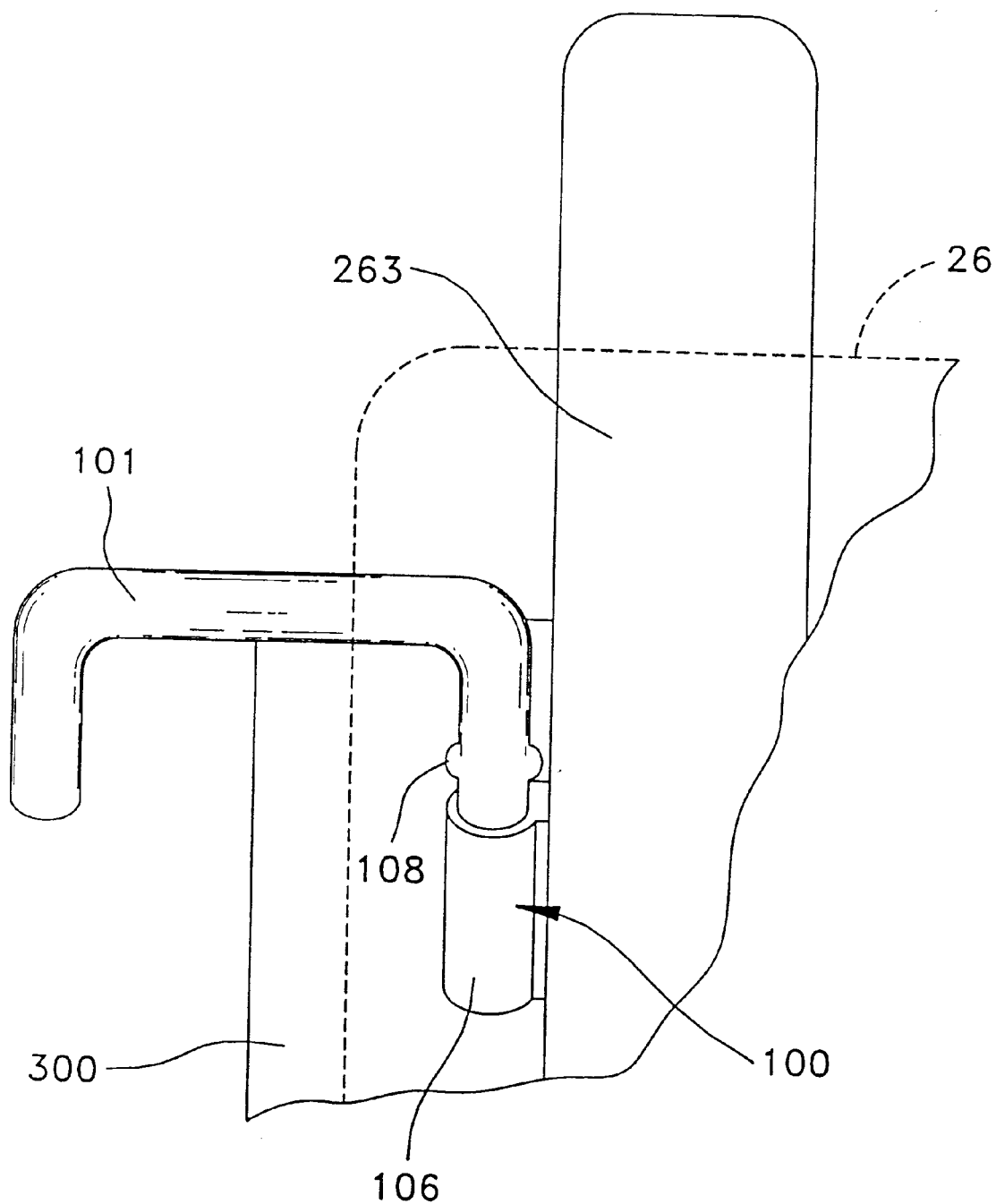
FIG. 7 is a partial top plan view similar to the view of FIG. 6, showing an unfolded hook assembly.

Preferably, the detent cap 103 has detents 107 that allow the hook 101 to be selectively positioned in two positions. In the first position, the hook 101 is positioned closely adjacent to the saw body for storage (see FIG. 6). Persons skilled in the art will note that the hook assembly 100 is disposed in such manner so that, when folded, the hook assembly 100 does not increase the height or width of the saw. Instead, the hook assembly 100 extends within the width of the shoe 300 when folded. Similarly, persons skilled in the art will note that the hook assembly 100 extends within the width of the housing 26 (shown in broken lines in FIGS. 6 and 7).

Figure 8:
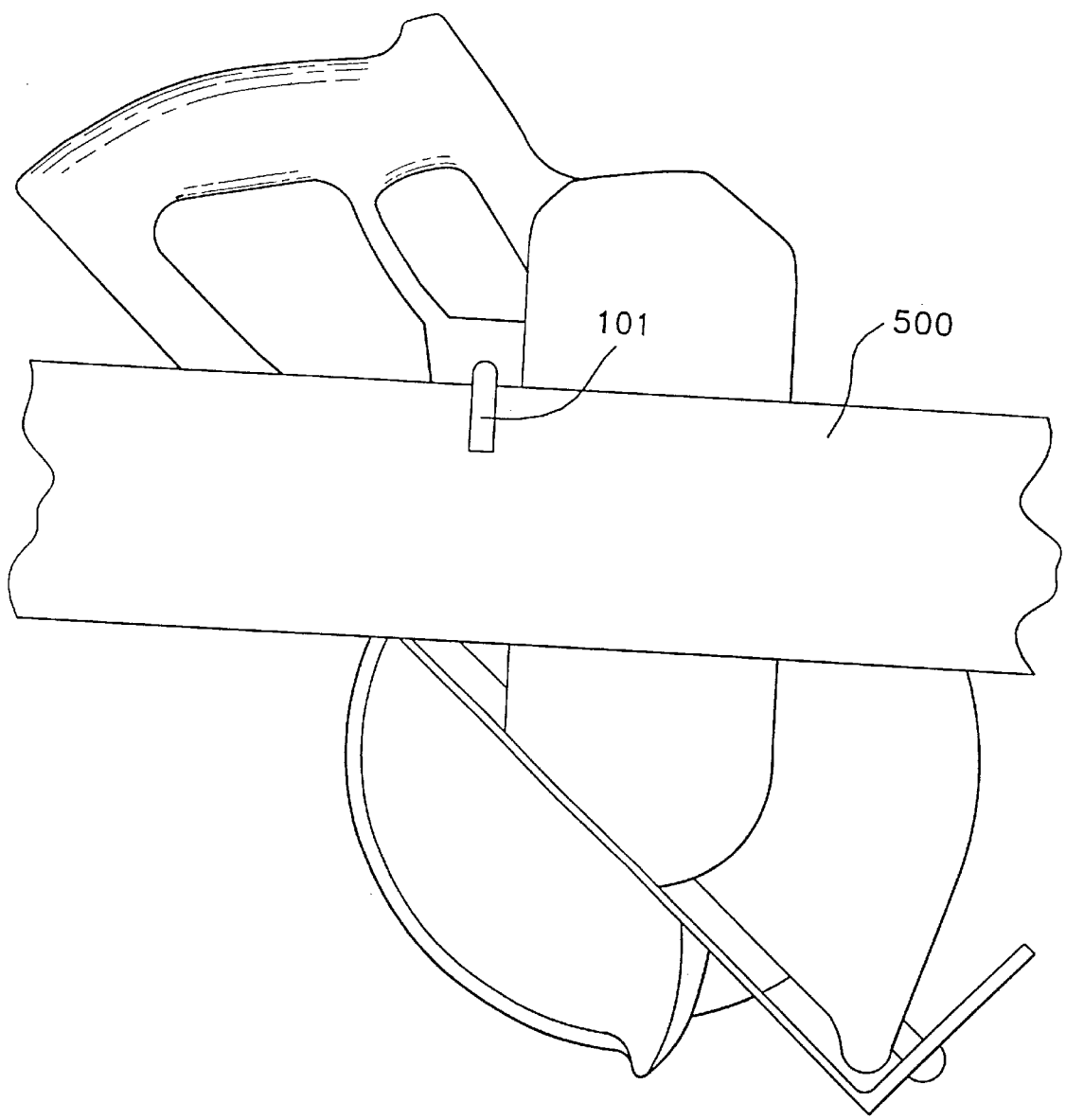
FIG. 8 illustrates the manner in which the saw of FIG. 3 is hung from a board.

In the second position, the hook 101 is preferably rotated through 90 degrees from the first position and thereby extends away from the saw body (see FIG. 7) so that the hook 101 may be hooked, for example, over a rafter 500 (see FIG. 8). The hook 101 may be selectively located in either of the two positions by pushing the hook 101 and spacer 105 against the bias of the spring 104 in the direction B to disengage the roll pin 102 from one of the detents 107. When disengaged, the hook 101 is rotated through 90 degrees such that the roll pin 102 is now aligned with the second of the two detents 107. The hook 101 is then released and the spring 104 then biases the roll pin 102 into the detent 107 as described above.

It is preferable that the hook assembly 100 is located on the saw relative to the center of gravity CG so that torque is created about the hook assembly 100 when the saw is hung from the hook assembly 100. The torque causes the center of gravity CG (and thus the saw) to pivot about the hook assembly 100, so that the handle 263 pivots upwards for ease of grasping by the user. Accordingly, in the saw of FIG. 5, it is preferable to attach the hook assembly 100 to a sidewall of the handle 263.

Persons skilled in the art may recognize other features that can be added to the embodiments described above, such as providing an auxiliary handle above the center of gravity or above the arbor. Similarly, persons skilled in the art may recognize other alternatives to the means disclosed herein. However, all these additions and/or alterations are considered to be within the scope of the claims underneath.

We claim:

1. A portable circular saw having a center of gravity comprising:
    a motor having an axis;
    a housing enclosing the motor therein;
    a handle carried by the housing;
    an arbor for carrying a saw blade, said arbor being operatively connected to the motor and having an axis of rotation substantially perpendicular to the motor axis; and
    a shoe pivotally supporting the housing thereon, the housing pivoting relative to the shoe about a pivoting axis which is substantially parallel to the arbor axis;
    wherein the housing is inclined at an angle relative to the shoe,
    part of the handle is disposed behind the arbor axis, between the housing and the shoe, and within said angle, and
    the pivoting axis is disposed in front of the arbor axis.

2. The saw of claim 1, wherein the angle is about 45°.

3. The saw of claim 1, further comprising a hook assembly attached to said handle.

4. The saw of claim 3, wherein the hook assembly is attached to said handle at a position relative to the center of gravity so that, when the circular saw is hung from said hook assembly, the handle pivots upward.

5. The saw of claim 3, wherein the hook assembly is a folding hook assembly.

6. The saw of claim 5, wherein the handle has a sidewall, the shoe has a width, and the hook assembly is attached to said sidewall of said handle so that, when said hook assembly is folded, the hook assembly substantially extends within the width of said shoe.

7. The saw of claim 5, wherein the handle has a sidewall, the housing has a width, and the hook assembly is attached to said sidewall of said handle so that, when said hook assembly is folded, the hook assembly substantially extends within the width of said housing.

8. The saw of claim 3, wherein the hook assembly comprises a barrel integrally attached to said handle, and a hook slidably connected to said barrel.

9. The saw of claim 8, wherein the hook assembly further comprises a detent cap attached to said barrel for holding the hook in a plurality of radial positions.

10. The saw of claim 9, wherein the hook assembly further comprises a spring biasing said hook against said detent cap.

11. The saw of claim 9, wherein the hook assembly further comprises biasing means for biasing said hook against said detent cap.

12. The saw of claim 1, further comprising a drive shaft disposed along the motor axis, and a transmission mechanism connected to said arbor and said drive shaft.

13. The saw of claim 12, wherein said transmission mechanism creates a torque in rotational direction opposite to rotational direction of said arbor.

14. The saw of claim 12, wherein said transmission mechanism comprises:
    a first gear disposed on said drive shaft; and
    a second gear disposed on said arbor, said second gear meshing with said first gear.

15. The saw of claim 14, wherein distance from the blade to the second gear is greater than distance from the blade to the drive shaft.

16. The saw of claim 1, further comprising a hook assembly attached to said housing.

17. The saw of claim 16, wherein the hook assembly is attached to said housing at a position relative to the center of gravity so that, when the circular saw is hung from said hook assembly, the handle pivots upward.

18. The saw of claim 16, wherein the hook assembly is a folding hook assembly.

19. The saw of claim 18, wherein the shoe has a width and, when said hook assembly is folded, the hook assembly substantially extends within the width of said shoe.

20. The saw of claim 16, wherein the hook assembly comprises a barrel integrally attached to said housing, and a hook slidably connected to said barrel.

21. The saw of claim 20, wherein the hook assembly further comprises a detent cap attached to said barrel for holding the hook in a plurality of radial positions.

22. The saw of claim 21, wherein the hook assembly further comprises a spring biasing said hook against said detent cap.

23. The saw of claim 21, wherein the hook assembly further comprises biasing means for biasing said hook against said detent cap.

24. The saw of claim 1, wherein a first plane substantially perpendicular to a second plane defined by the shoe intersects the shoe, the handle and the housing, in that order, when the saw is at a maximum depth of cut setting.

25. The saw of claim 1, wherein said angle being less than about 90°.

26. The saw of claim 1, wherein the distance between the pivoting axis and the shoe is smaller than the distance between the arbor axis and the shoe.

* * * * *